(12) United States Patent
Christian et al.

(10) Patent No.: US 7,161,530 B2
(45) Date of Patent: Jan. 9, 2007

(54) SYSTEM AND METHOD FOR RADAR CALIBRATION USING ANTENNA LEAKAGE

(75) Inventors: Michael R. Christian, Owens Cross Roads, AL (US); Ralph H. Halladay, Huntsville, AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 129 days.

(21) Appl. No.: 11/066,652

(22) Filed: Feb. 22, 2005

(65) Prior Publication Data

US 2006/0227040 A1 Oct. 12, 2006

(51) Int. Cl.
G01S 7/40 (2006.01)

(52) U.S. Cl. .................. 342/174; 342/80; 342/194; 342/196; 342/152

(58) Field of Classification Search ............... 342/173, 342/174, 62, 80, 89–103, 141, 192–196, 342/149–154

See application file for complete search history.

(56) References Cited

U.S. PATENT DOCUMENTS

| | | | | |
|---|---|---|---|---|
| 3,860,925 A | * | 1/1975 | Darboven, Jr. | 342/109 |
| 4,488,155 A | * | 12/1984 | Wu | 342/376 |
| 4,806,935 A | * | 2/1989 | Fosket et al. | 342/120 |
| 5,682,165 A | * | 10/1997 | Lewis et al. | 342/174 |
| 5,771,016 A | * | 6/1998 | Mullins et al. | 342/372 |
| 5,808,578 A | * | 9/1998 | Barbella et al. | 342/62 |
| 5,861,837 A | * | 1/1999 | Richardson et al. | 342/198 |
| 6,424,286 B1 | * | 7/2002 | Smith et al. | 342/14 |
| 6,707,417 B1 | * | 3/2004 | Huettner et al. | 342/174 |
| 6,771,560 B1 | * | 8/2004 | Lyon et al. | 367/13 |
| 6,933,877 B1 | * | 8/2005 | Halladay et al. | 342/14 |
| 2003/0223480 A1 | * | 12/2003 | Cafarella | 375/219 |
| 2005/0270226 A1 | * | 12/2005 | Hager et al. | 342/120 |

FOREIGN PATENT DOCUMENTS

| | | | |
|---|---|---|---|
| JP | 02218981 A | * | 8/1990 |
| WO | WO 9919744 A1 | * | 4/1999 |

OTHER PUBLICATIONS

"Phase calibration of polarimetric radar images", Sheen, D.R.; Freeman, A.; Kasischke, E.S. Geoscience and Remote Sensing, IEEE Transactions on vol 27, Issue 6, Nov. 1989 pp. 719-731.*

(Continued)

*Primary Examiner*—John B. Sotomayor
(74) *Attorney, Agent, or Firm*—Hay Kyung Chang

(57) ABSTRACT

The system and method for radar calibration using antenna leakage is a simplified means of calibrating the channels in amplitude and phase using natural signal leakage between antennas. It utilizes as calibration signal a wideband sinusoidal Frequency Modulated Continuous Wave (FMCW) waveform with a modulation index and modulation frequency chosen to generate spectral components (or discrete signal frequencies) that fall within the receiver Doppler passband of the radar. The calibration signal is radiated out of the transmitting antenna and enters the radar receiver front-end through the transmit-to-receive antenna leakage which occurs naturally. This technique provides a low-complexity (simpler hardware realization) means for achieving a wideband calibration rapidly and is a practical alternative to the conventional calibration approach that relies on generating offset Doppler signals that are coupled into the radar receiver front-end through the use of couplers and cabling within the radar.

9 Claims, 4 Drawing Sheets

OTHER PUBLICATIONS

"Calibration of complex polarimetric SAR imagery using backscatter correlations", Klein, J.D. Aerospace and Electronic Systems, IEEE Transactions on vol. 28, Issue 1, Jan 1992 pp. 183-194.*

"Filters for polarimetric calibration of UWB SAR imagery", Showman, G.A.; McClellan, J.H. Radar Conference. Proceedings of the IEEE 2001 pp. 432-437.*

* cited by examiner

US 7,161,530 B2

SYSTEM AND METHOD FOR RADAR CALIBRATION USING ANTENNA LEAKAGE

DEDICATORY CLAUSE

The invention described herein may be manufactured, used and licensed by or for the Government for governmental purposes without the payment to us of any royalties thereon.

BACKGROUND OF THE INVENTION

Radars generally employ monopulse direction-finding to determine the bearing angle to a selected target. In a typical monopulse direction-finding scheme, a single transmitted beam from a transmitting antenna (illuminator) radiates the target and is reflected by the target. From the reflected beam that is received at the receive antenna of the radar, four reference beams are generated; this may be the result of using one antenna for both the transmit and receive functions or a separate antenna exclusively for the receive function.

From the four separate reference beams, the bearing angle to the target is derived in both the azimuth and elevation planes. This is illustrated in FIG. 1. As shown in the figure, the reference beams A, B, C and D from the four quadrants of receive antenna 101 are fed into comparator 103 where the sum and delta components are generated. The sum and delta components, in both the azimuth and elevation planes, are then input to their respective, separate channels 105, 107 and 109 where they are typically amplified and Doppler-filtered. Thereafter, the sum and delta components are input to signal processor 111 which performs the digitization and Fast Fourier Transform of them to produce the ratios of the delta over sum voltage, in both azimuth and elevation, that are indicative of the particular angle of the target's position with respect to the radar at the moment the radiating beam was reflected from the target.

A critical requirement in the proper operation of such a direction-finding radar to obtain accurate angular measurements of the target's position is that channels 105, 107 and 109 be balanced. The amplitude and phase errors between the channels that may result from component tolerances, temperature drift, etc. must be measured and removed. If such calibration is not performed, the amplitude and phase errors that are due to the channels themselves will falsely be attributed to the wave angle of the received beam and result in inaccuracies in the angular positional measurements of the target.

Currently, calibration of a monopulse radar is typically achieved by generating from sideband generator 201 a single sideband signal which is offset from the transmitting antenna frequency but within the Doppler passband of the receive antenna, dividing the signal with power divider 203 into three portions which are then injected to the three channels via couplers 205, 207 and 209 as shown in FIG. 2. While this is adequate to perform the calibration, the injection circuitry takes up volume since it is often built from bulky waveguide. Waveguide is used because coax-based transmission lines frequently experience phase delay changes with respect to temperature due to thermal expansion. Additionally, the couplers suffer insertion loss, thereby resulting in a decrease in the minimum signal sensitivity of the radar system. Further, since only a single frequency is injected into the Doppler filter passband, the calibration process must be repeated numerous times using different frequencies in order to calibrate the entire radar receiver passband.

SUMMARY OF THE INVENTION

The system and method for radar calibration using antenna leakage is a simplified means of calibrating the channels in amplitude and phase using natural signal leakage between antennas. It utilizes as a calibration signal a wideband sinusoidal Frequency Modulated Continuous Wave (FMCW) waveform with a modulation index and modulation frequency chosen to generate spectral components (or discrete signal frequencies) that fall within the receiver Doppler passband of the radar. The calibration signal that is radiated out of the transmitting antenna appear in the radar receiver front-end through the transmit-to-receive antenna leakage which occurs naturally.

DESCRIPTION OF THE PREFERRED EMBODIMENT

Figure 1:
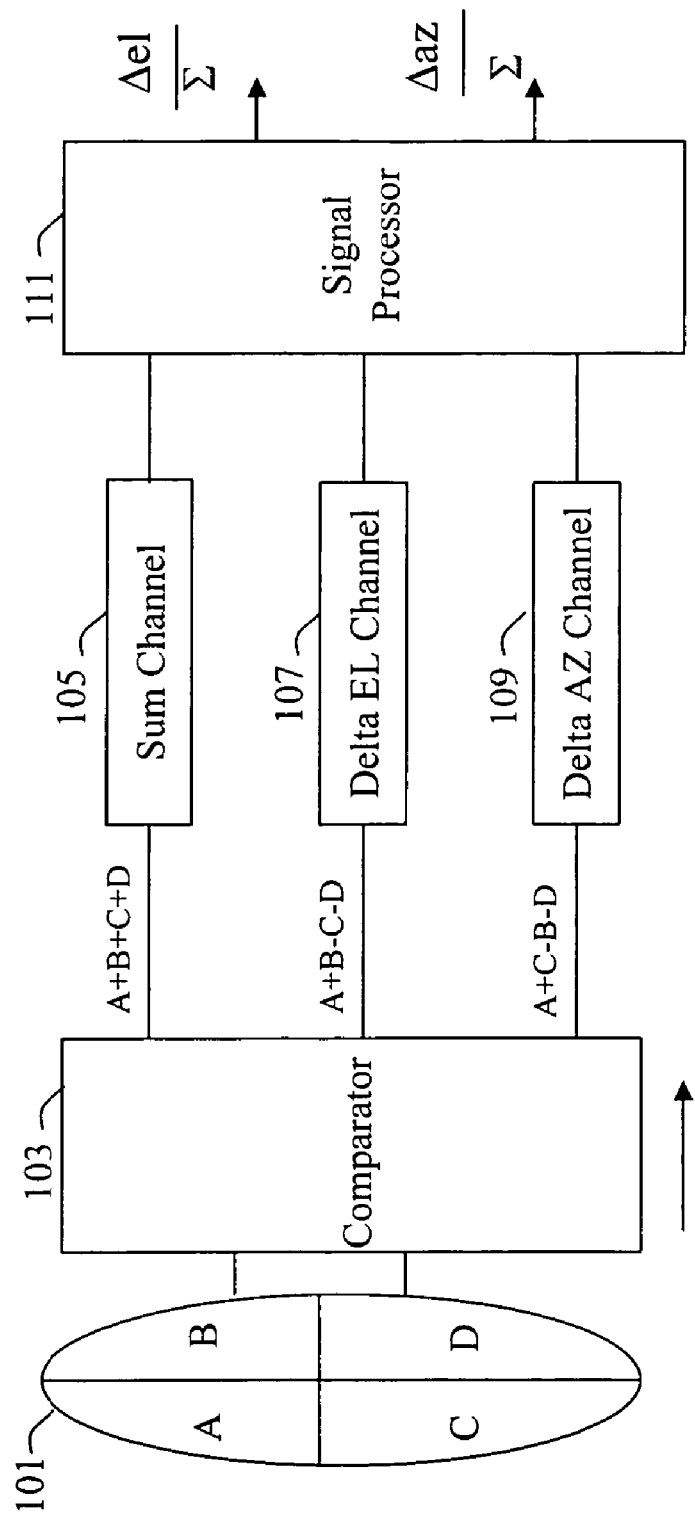
FIG. 1 illustrates the derivation of the bearing angle to the target in a typical monopulse radar.
Figure 2:
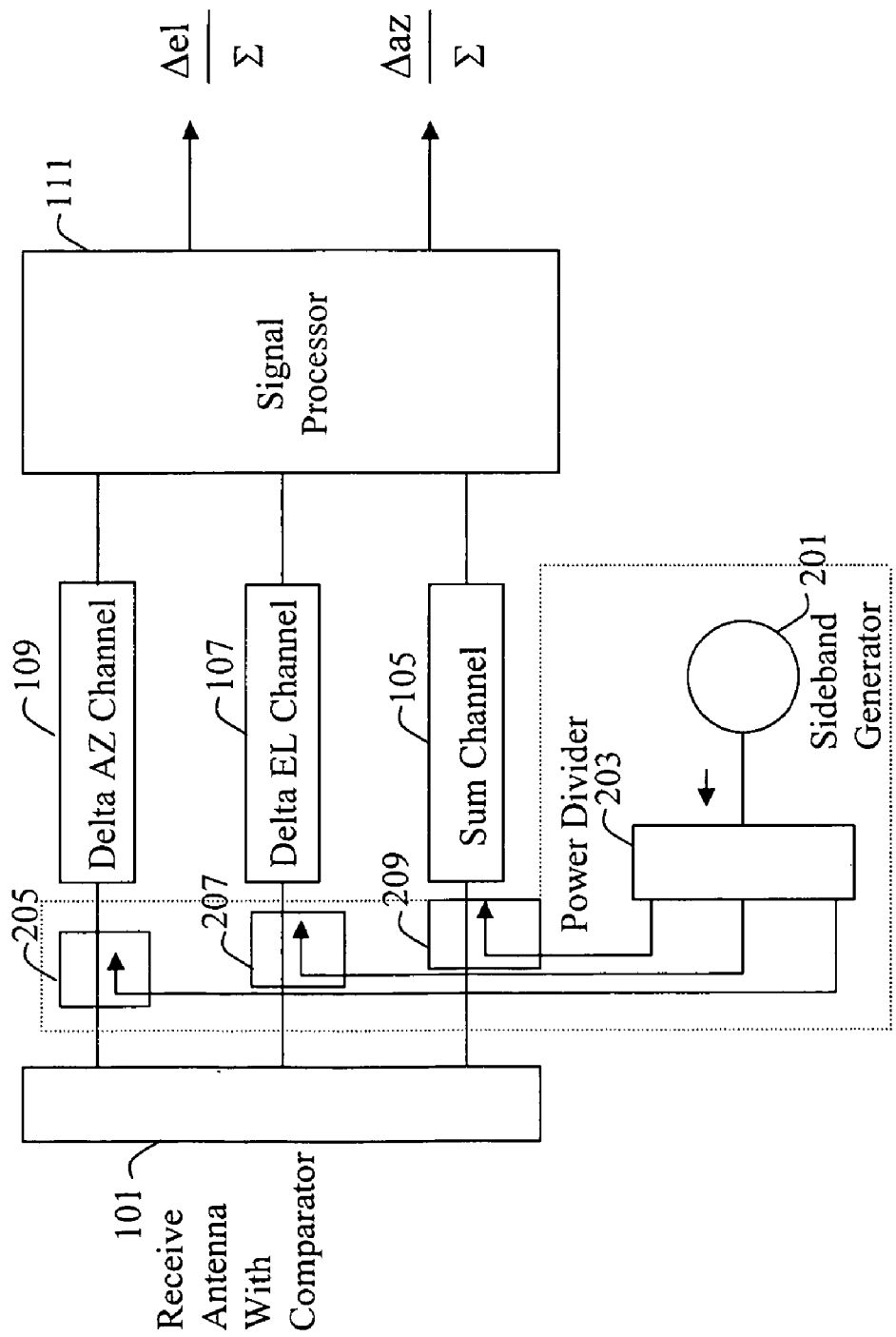
FIG. 2 depicts the current method of channel calibration.
Figure 3:
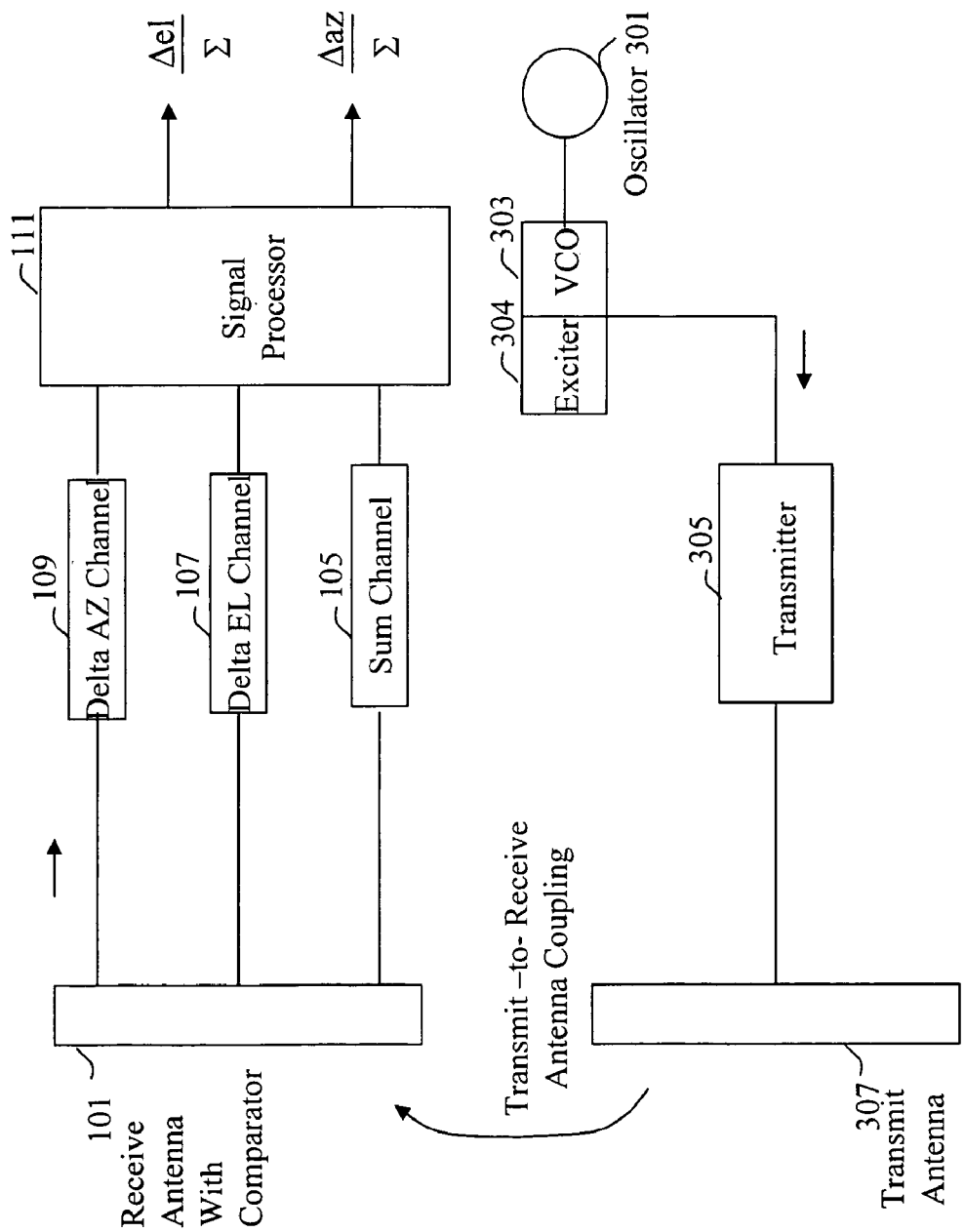
FIG. 3 shows the system and method for radar calibration using natural antenna leakage.

Referring now to the drawing wherein like numbers represent like parts in each of the several figures and lines with arrow heads indicate the direction of signal travel, the calibration scheme utilizing natural antenna leakage is explained in detail.

The calibration signal to be used is a wideband sinusoidal frequency modulated (FM) signal produced by applying a sinewave from low frequency oscillator 301 to the voltage output of high frequency voltage controlled oscillator (VCO). The sinusoidal frequency modulated signal can be described by the following equation:

$$S(t) = A^* \cos(2\pi f_c t + \Theta(t))$$

where $\Theta(t) = \beta^* \sin 2\pi f_m t$; $f_c$=transmitting antenna frequency; $f_m$=modulation frequency; A=amplitude of the signal; $\beta$, the modulation index, is defined as $\beta = \Delta F / f_m$; $\Delta F$ is the peak frequency deviation and t=time.

Figure 4:
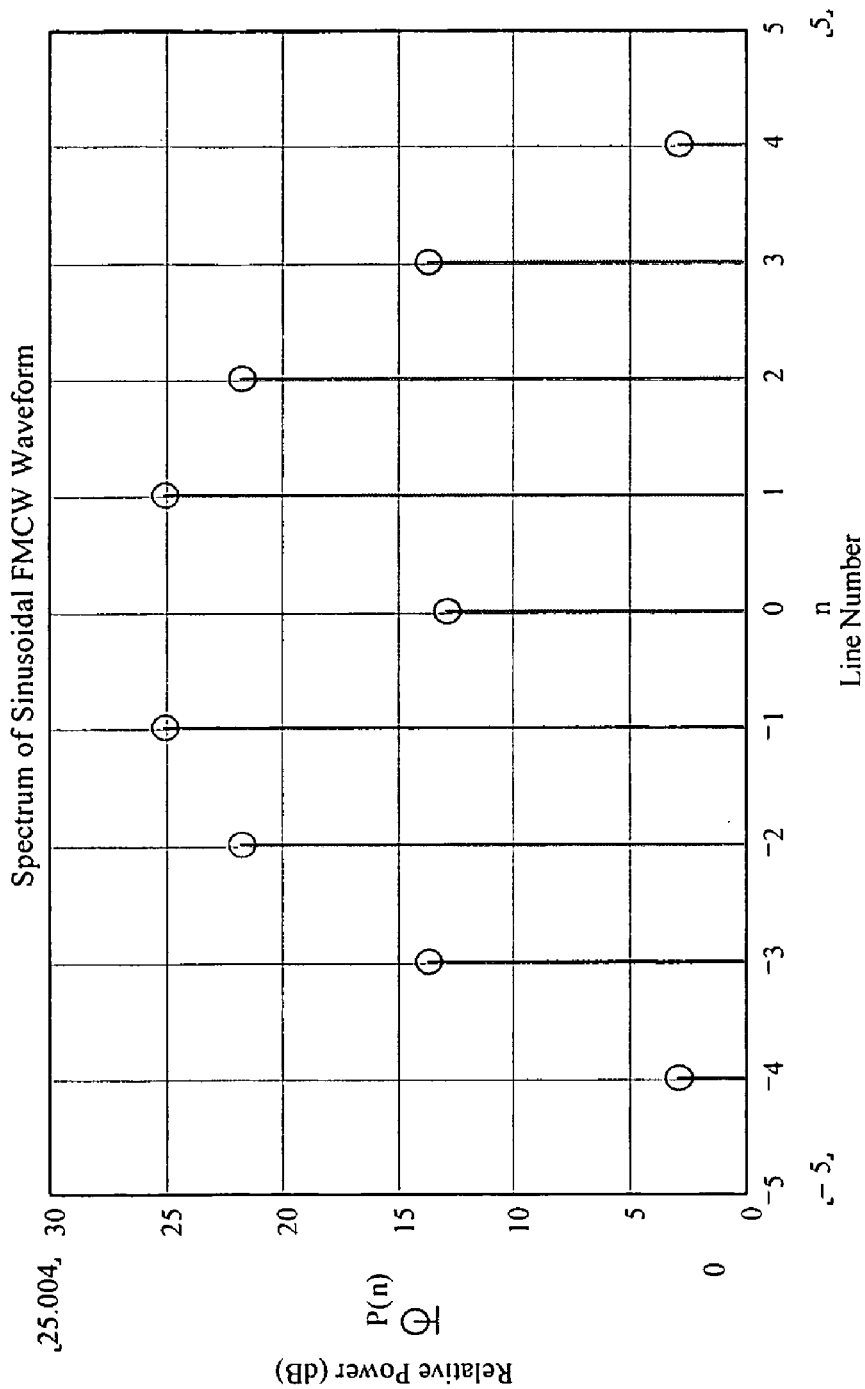
FIG. 4 shows an exemplary sinusoidal FMCW waveform which can be used as the calibration signal.

An exemplary spectrum is shown in FIG. 4 for a modulation index of 2.15. At each harmonic of the modulation frequency, there is a spectral line. For instance, if a 10 KHz modulation frequency is used, the 20 KHz component is up 8.9 dB from the center spectral line which is at the transmitting antenna frequency. As graphically shown in the figure, there are 9 spectral lines that could potentially be injected into the receiver front-end and, therefore, could serve as calibration signals: by injecting multiple spectral lines, a wideband calibration may be achieved and much more quickly than sequentially injecting narrowband signals across the Doppler passband. The wideband injection technique utilizes the inherent transmit-to-receive electromagnetic coupling that occurs between the antennas. While the coupling may be anywhere from 40 to 80 dB in a typical radar, there is sufficient signal-to-noise ratio from the calibration signal after it has leaked across to provide good reference beams at the receive antenna for characterizing each of the channels' amplitude and phase. The calibration is to be performed intermittently with the actual usage of the radar to obtain a selected target's angular measurements so that the channels are constantly kept in balance. The calibration process, normally expected to take no more than several milliseconds, would be typically performed once every 5 to 30 minutes, depending on how fast the radar tends to drift.

To perform a complete cycle of calibration using natural leakage, the sinusoidal frequency modulated signal is input to exciter 304. The exciter, then, upconverts the signal to the frequency of transmitting antenna 307 to which the signal travels via transmitter 305. From the transmitting antenna, the calibration signal is coupled by leakage to receive antenna 101 from which it flows through the comparator on to sum and delta channels 105, 107 and 109. Signal processing is performed on the calibration signal, as described above, with the resulting production of a digital filter bank enabling the resolution of the individual spectral lines. The ultimate outcome of the signal processing is that the amplitude and phase of each spectral line across the Doppler passband from the sum channel may now be compared with the amplitude and phase from the delta channels. The change in amplitude and phase may then be established and a corresponding amplitude and phase correction factor generated. This correction factor is applied to the subsequent radar measurements of incoming radiation to account for the imbalance due to the channels themselves and thereby produce more accurate angular and velocity measurements of the targets, from which the incoming radiation emanated, at the moment of the emanation.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

We claim:

1. A method for calibrating a radar in amplitude and phase, said calibrating method utilizing natural leakage between a receive antenna and a transmit antenna and comprising the steps of:
   generating a wideband, high-frequency calibration signal;
   modulating the high-frequency calibration signal;
   upconverting the calibration signal to the frequency of the transmit antenna;
   allowing leakage of the calibration signal to occur between the transmit and receive antennas;
   introducing the leaked calibration signal to the sum and delta calculations performed on all received signals;
   producing a digital filter of the calibration signal;
   establishing the change in amplitude and phase; and
   yielding a corresponding amplitude and phase correction factor.

2. A calibration method as set forth in claim 1, wherein said modulating step comprises applying a low-frequency sine wave to said wideband, high-frequency calibration signal.

3. A calibration method as set forth in claim 2, wherein said producing step comprises performing Fast Fourier Transform on the calibration signal so as to resolve the individual spectral lines of the signal.

4. A calibration method as set forth in claim 3, wherein said calibrating method further comprises the step of amplifying and Doppler-filtering said calibration signal prior to said producing step.

5. In a monopulse radar for acquiring a target, the radar having a transmit antenna; a receive antenna; a comparator coupled to the receive antenna for producing the delta and sum components of the signals impinging on the receive antenna; a plurality of channels for transmitting therethrough the delta and sum components; and a signal processor coupled to the channels for processing the components to produce discriminants indicative of the target's angular position relative to the radar at any particular moment in time, A System for calibrating said channels in amplitude and phase so as to achieve more accurate angular measurements of the target's positions, said System comprising: a means for producing a wideband, high-frequency calibration signal; a means for modulating the calibration signal, said modulating means being coupled to said producing means; a means for converting said modulated calibration signal to the carrier frequency of said transmit antenna; and a transmitter, coupled between said converting means and said transmit antenna, to transmit said converted, modulated signal to said transmit antenna to be leaked therefrom to said receive antenna, said leaked modulated calibration signal further being introduced to the sum and delta channels and being processed so as to yield a correction factor for the amplitude and phase of the calibration signal, said correction factor being applied to subsequent target signals impinging on said receive antenna from targets to determine more accurately the angular positional measurements of said targets relative to the radar at any particular moment in time.

6. A calibration system as set forth in claim 5, wherein said means for producing said wideband, high-frequency calibration signal is a high-frequency voltage-controlled oscillator.

7. A calibration system as set forth in claim 6, wherein said modulating means is a sinewave generator.

8. A calibration system as set forth in claim 7, wherein said calibration signal is a continuous wave.

9. A calibration system as set forth in claim 8, wherein said calibration system further comprises a means for Doppler-filtering said calibration signals and target signals to determine the velocity of the source of said signals.

* * * * *